United States Patent [19]

Raatz et al.

[11] Patent Number: 4,780,436
[45] Date of Patent: Oct. 25, 1988

[54] ZEOLITE OF OMEGA STRUCTURE CATALYSTS

[75] Inventors: Francis Raatz, Rueil Malmaison; Christian Marcilly, Houilles; Pierre Dufresne, Rueil Malmaison, all of France

[73] Assignee: Institut Francais du Petrole, Rueil-Malmaison, France

[21] Appl. No.: 904,081

[22] Filed: Sep. 4, 1986

[30] Foreign Application Priority Data

Sep. 4, 1985 [FR] France .................. 85 13105
Sep. 4, 1985 [FR] France .................. 85 13104

[51] Int. Cl.$^4$ ............................. B01J 29/30
[52] U.S. Cl. ............................. 502/66; 502/71; 502/74
[58] Field of Search ............ 502/71, 77, 78, 64, 502/66

[56] References Cited

U.S. PATENT DOCUMENTS

| | | | |
|---|---|---|---|
| 3,367,884 | 2/1968 | Reid, Jr. .................. | 502/78 |
| 3,551,510 | 12/1970 | Pollitzer et al. ............ | 502/78 |
| 3,640,681 | 2/1972 | Pickert .................... | 502/78 |
| 3,812,199 | 5/1974 | Chen et al. ............... | 208/120 |
| 3,944,482 | 3/1976 | Mitchell et al. ........... | 252/455 Z |
| 4,120,825 | 10/1978 | Ward ...................... | 502/64 |
| 4,228,036 | 10/1980 | Swift et al. ............... | 252/437 |
| 4,241,036 | 12/1980 | Flanigen et al. ........... | 502/62 |
| 4,297,335 | 10/1981 | Lok et al. ................. | 502/60 |
| 4,331,643 | 5/1982 | Rubin et al. .............. | 502/77 |
| 4,377,502 | 3/1983 | Klotz ...................... | 502/77 |
| 4,515,902 | 5/1985 | Shioiri et al. .............. | 502/64 |
| 4,591,576 | 5/1986 | Chiang et al. ............. | 502/65 |

OTHER PUBLICATIONS

"Thermochemical Properties of Ammonium Exchanged Type Omega Zeolite", Thomas J. Weeks et al., JCS Faraday Trans. I, vol. 72, p. 575 (1976).
Gregg et al., "Adsorption, Surface Area and Porosity" (1982), Academic Press, Inc., pp. 209–229 and 283–286.

Primary Examiner—Carl F. Dees
Attorney, Agent, or Firm—Millen & White

[57] ABSTRACT

The invention concerns a new stabilized and dealuminated zeolite of OMEGA structure, characterized by:
a total $SiO_2/Al_2O_3$ molar ratio of at least 10,
a sodium content lower than 0.5% by weight,
a and c parameters of elementary mesh respectively lower than 1.814 nm and 0.759 nm,
a nitrogen adsorption capacity at 77 K higher than about 5% by weight for a partial pressure $P/P_o$ of 0.19,
a lattice of mesopores whose radii range preferably from 1.5 to 14 nm.

This zeolite can be used in admixture with a convenient matrix in reactions of hydrocarbon conversion.

15 Claims, No Drawings

ZEOLITE OF OMEGA STRUCTURE CATALYSTS

The present invention relates to a new stabilized and dealuminated zeolite of reduced sodium content and to its manufacture from an Ω zeolite of $SiO_2/Al_2O_3$ ratio ranging from 6 to 10, generally containing more than 1% by weight and usually more than 4% by weight of sodium.

The stabilized and dealuminated omega zeolite according to the present invention has a $SiO_2/Al_2O_3$ molar ratio of at least 10 and preferably higher than 15, a sodium content lower than 0.5% by weight and preably lower than 0.1% by weight. The stabilized and dealuminated solid keeps the X-ray diffraction spectrum of Ω zeolite with crystalline parameters a and c respectively lower than 1.814 nm and 0.759 nm, preferably respectively lower than 1.804 nm and 0.753 nm.

Its nitrogen adsorption capacity, at 77 K under a partial pressure $P/P_0$ of 0.19, is higher than 5%, preferably higher than 11% by weight. The solid obtained according to the invention has a secondary lattice of pores of radii, as determined by the BJH method, ranging preferably from 1.5 to 14 nm, more preferably from 2.0 to 8.0 nm. The volume of the secondary pores represents 5 to 50% of the zeolite total pore volume, the major part of the remaining pore volume being contained in micropores of diameter lower than 2.0 nm.

BACKGROUND OF THE INVENTION

The manufacturing procedure of the above-described product is based on alternating ion exchanges with ammonium cations, acid etchings and thermal treatments in the presence or absence of steam. These treatments have been used in the prior art to stabilize various zeolites. However Ω zeolite is known as having a very low stability. The preparation of stabilized and dealuminated Ω zeolites, particularly by the above-mentioned treatments, was unsuccessful up to now. The decationization and dealumination treatments according to the invention considerably improve, on the one hand, the acid properties of Ω zeolite and on the other hand, its stability. This Ω zeolite then can be used as catalyst or as catalyst carrier in applications involving reactions by acid action as hydrocracking or hydroisomerization of oil cuts.

OMEGA zeolite (called ZSM-4 by MOBIL Company) is the synthetic counterpart of MAZZITE which is a natural zeolite. Ω zeolite is synthesized in the presence of sodium cations and of organic cations, generally TMA (tetramethylammonium) (Dutch patent 6 710 729, U.S. Pat. No. 4,241,036). The Na/TMA molar ratio is generally close to 4 (Ref. 1: T. WEEKS, D. KIMAK, R. BUJALSKI and A. BOLTON, JCS Farad Trans 1, 72, (1976), 57; Ref. 2: F. LEACH and MARSDEN, Catalysis by Zeolites, B. IMELIK ed, 1980, p. 141, Elsevier (Amsterdam), and the $SiO_2/Al_2O_3$ molar ratio is in the range from 5 to 10 (U.S. Pat. No. 4,241,036), T. WEEKS, D. KIMAK, R. BUJALSKI and A. BOLTON, JCS Farad Trans 1, 72, (1976), 57, F. LEACH and C. MARSDEN, Catalysis by Zeolites, B. IMEKIK ed., 1980, p. 141, Elsevier (Amsterdam); Ref. 3: A. ARAYA, T. BARBER, B. LOWE, D. SINCLAIR and A. VARMA, Zeolites, 4, (1984), 263). Ω zeolite crystallizes in the hexagonal system with parameters $\overline{a}$ and $\overline{c}$ respectively close to 1.82 nm and 0.76 nm (T. WEEKS et al, ref. 1, R. BARRER and H. VILLIGER, Chem Comm. (169), 65). The Ω zeolite structure is formed by the arrangement of gmelinite cages interconnected along $\overline{c}$ axis (W. MEIER, D. OLSON, Atlas of Zeolites Structures Types, DRUCK+VERLAG AG, Zurich, 1978). The particular arrangement of the gmelinite cages in Ω zeolite provides in the structure of lattice of 12 side-channels of diameter close to 0.74 nm, parallel to the $\overline{c}$ axis.

With pores of about 0.7 nm diameter, the Ω zeolite is of the category of zeolites of wide pore openings, making it particularly attractive for reactions such as cracking and hydrocracking. Although some of its properties are a priori of interest in catalysis, the catalytic performance of Ω zeolite have not yet been much investigated.

Only a limited number of reactions, such for example as isomerization of substituted cyclopropanes (F. LEACH et al, ref. 2) or n-heptane cracking (A. Perrota, C. Kibby, B. Mitchell and E. Tucci, J. Catal, 55 (1978), 240) have been studied. For this latter reaction the authors indicate that, after exchange with $NH_4+$ and roasting at 500° C., Ω zeolite has an initial activity higher than that of Y zeolite. However, when so treated, Ω zeolite deactivate very quickly.

The main reason for the limited number of studies devoted, up to now, to the catalytic properties of Ω zeolite, is the low thermal stability of said zeolite. As a matter of fact, it is well known in the scientific literature that Ω zeolite as NaTMA or $NH_4TMA$ may be destroyed (T. WEEKS D. KIMAK et al. ref. 1) or may undergo a considerable decrease in its crystallinity (F. LEACH and C. MARSDEN et al. ref. 2) by roasting above 600° C. Many reasons have been set forth to explain the brittleness of Ω zeolite during thermal treatments. This brittleness could be due to too small crystal size (T. WEEKS, D. KIMAK, et al. ref. 1; A. ARAYA, T. BARBER et al. ref. 3) or could result from the particular action of TMA cations in the crystalline structure cohesion (T. WEEKS et al. ref. 1). The reason of the thermal brittleness of Ω zeolite still remains not well understood.

In certain operating conditions, it is possible to partly save the crystallinity of Ω zeolite during thermal treatments. However, as indicated below, the obtained products are not interesting for acid catalysis. The roasting of a NaTMA Ω form in low amount in an apparatus of differential thermal analysis leads to a solid which remains crystallized at 800° C. (A. ARAYA, T. BARBER et al. ref. 3); such a solid is not dealuminated and still contains all the initial alkali cations. The roasting, in conditions of thick bed, of the $NH_4TMA$ Ω form, also leads to an increase of the thermal stability (T. WEEKS, D. KIMAK et al. ref. 1) but the obtained solids have only a very limited activity in hydrocracking and isomerization.

With respect to the dealumination of Ω zeolite, several techniques have been proposed. These techniques, which will be described hereinafter, do not provide solids having the desired specifications, particularly a high $SiO_2/Al_2O_3$ ratio combined with the existence of a secondary pore lattice. In U.S. Pat. No. 3,937,791, W. GARWOOD et al. claim the dealumination of various zeolites, including Ω zeolite, by Cr (III) salts. This method leads to a replacement of the aluminum atoms by chromium atoms. Whereas the structure is dealuminated, its chromium content is also fatally increased. B. LOK et al. propose a dealumination technique by treatment with fluorine gas at high temperature (U.S. Pat. No. 4,297,335) applicable to various zeolites but which, when applied to Ω zeolite, results in a degradation of the crystalline structure. In another patent (EP No. 100 544), the dealumination of many zeolites, including Ω zeolite, by roasting in the presence of $SiCl_4$ and temperatures lower than 200° C., is claimed. This claim is quite surprising inasmuch as higher temperatures are known to be necessary for dealuminating zeolites by said technique (K. BEYER and I. BELENNYKAJA, Catalysis by Zeolites, B. IMELIK et al. (Ed), (1980), 203). The dealumination of Ω zeolite by $SiCl_4$ seems effectively possible but at high temperatures, 500° C. for example (ref. 4 J. KLINOWSKI, M. ANDERSON and J. THOMAS, JCS, Chem. Commun. 1983, p. 525, O. TERASAKI, J. THOMAS and G. MILLWARD, Proc. R. Soc. London (A), 395 (1808), 153–64).

However, even in these conditions, the increase of the Si/Al ratio is apparently limited since the latter only increases from 4.24 before treatment to 4.5 after treatment (J. KLINOWSKI, M. ANDERSON et al. ref. 4). Inasmuch as dealumination by treatment with $SiCl_4$ is applicable to Ω zeolite, it is essential to emphasize that this technique leads to the irremediable replacement of the aluminum atoms of the structure by silicon atoms (H. BEYER and I. BELENYKAJA, Catalysis by Zeolites, B. IMELIK et al. editors (1980), p. 203, Elsevier Amsterdam). The obtained zeolite thus remains perfectly microporous (H. BEYER and I. BELENYKAJA). No creation of secondary pore lattice as in the presently recommended technique, occurs. This secondary lattice has an important action in the conversion of heavy hydrocarbons. On the contrary, according to reference 4 (J. KLINOWSKI. M. ANDERSON et al.), the mesh size of the zeolite dealuminated by $SiCl_4$ increases, exactly the opposite of the result obtained by the method according to the present invention.

Finally, it appears that, in the present state of the art, it is not known how to prepare Ω zeolites in hydrogen form, stabilized, dealuminated, of small mesh volume and having a secondary pore lattice. From Ω zeolites having these properties it is possible to prepare catalysts active and selective particularly for example in cracking and hydrocracking reactions.

Ω dealuminated Zeolites

It has been observed that it is possible, by alternating ion exchanges in solutions of a ionizable ammonium salt or acid etchings and thermal treatments, to obtain, from an Ω zeolite produced by synthesis (of NaTMA type for example), whose $SiO_2/Al_2O_3$ molar ratio ranges from 6 to 10, a well crystallized Ω zeolite, in hydrogen form, sodium content lower than 0.5%, preferably lower than 0.1% by weight and whose $SiO_2/Al_2O_3$ ratio is higher than 10 or even 50.

The manufacturing process is characterized by:

(a) a first step of subjecting the synthetic zeolite to a treatment for removing the major part of the organic cations, while decreasing the alkali content to less than 0.5% by weight, by at least one treatment selected from cation exchange and roasting, and (b) a second step of subjecting the solid obtained in the preceding step to at least one roasting and then to at least one acid etching, so as to obtain a $SiO_2/Al_2O_3$ molar ratio higher than 10.

The ion (cation) exchanges and acid etchings are performed at temperatures generally ranging from 0° to 150° C. For ion exchanges, solutions of ionizable ammonium salts, preferably ammonium nitrate or chloride, are used. The acid etchings are performed in solutions of inorganic acids (HCl for example) or organic acids ($CH_3COOH$ for example). The thermal treatments are conducted between 400° and 900° C. with or without steam injection. The product obtained at the end of these various treatment steps has a X-ray diffraction spectrum which is that of Ω zeolite (Table 1). The crystalline parameters have the following sizes: a is in the range from 1.814 nm to 1.794 nm and c in the range from 0.759 nm to 0.749 nm. The nitrogen adsorption capacity at 77 K for a partial pressure of 0.19 is higher than 5% by weight. The pore lattice is no longer formed only of micropores but comprises a lattice of mesopores whose radii, measured by the BJH method (see below), range from 2.0 nm to 8.0 nm and more generally from 1.5 to 14 nm. The volume of the mesopores corresponds to about 5 to 50% of zeolite total pore volume.

Characterization of dealuminated Ω zeolites

The Ω zeolite of high silicium content obtained according to the present invention has been characterized by the following techniques:

X-ray diffraction

The apparatus comprises: a PHILIPS generator PW 1130 (35 mA, 35 KV), a PHILIPS goniometer PW 1050, a Cu tube (fine focus), a graphite rear monochromator, an automatic sample feeder.

From the X-ray diffraction spectra, measurements were made, on each sample, of the bottom surface over an angular interval ($2\theta$) from 6° to 32° on the one hand, and, in the same zone, of the lines area, expressed as the number of pulses for a step-by-step recording of 2 seconds with steps of 0.02° ($2\theta$). The percentage of crystallized product is expressed as the ratio (lines area/total area). Then the ratios of each treated sample are compared with a standard reference of the same series as the sample and containing a sodium amount of at most 1% by weight. Thus the crystallinity rate is expressed in percent with respect to an arbitrary reference of 100.

A good selection of the reference is important, since, sometimes, an intensity enhancement or decrease of the lines may occur in relation with the cations content of the samples.

The crystalline parameters have been calculated by the least square method from the formula (hexagonal mesh):

$$d = \sqrt{\left[\frac{4}{3} a^2(h^2 + k^2 + hk)\right] + \frac{l^2}{c^2}}$$

Microporosity

The mesoporosity is determined by the BJH technique (BARRET, JOYNER, HALENDA, J. Am. Chem. Soc, 73,373 (1951) based on the digital processing of the nitrogen desorption isotherm; the total pore volume is measured at a nitrogen pressure P such that $P/Po=0.9$, Po being the nitrogen saturating vapor pressure at the temperature of the measurement. The micropore volume is calculated from the amount of adsorbed nitrogen at 77 K for a partial pressure $P/Po$ of 0.19.

Chemical analysis

The chemical composition of the samples has been determined by conventional chemical analysis: X fluorescence and atomic absorption.

Preparation of dealuminated Ω zeolites

The initial zeolite is obtained by synthesis. It contains alkali cations (generally $Na^+$) and organic cations (generally TMA or TPA). The ratio $$\frac{\text{alkali cations}}{\text{organic cations + alkali cations}}$$

is in the range (1–0.50) and the $SiO_2/Al_2O_3$ molar ratio in the range from 6 to 10.

SUMMARY OF THE INVENTION

The method used according to the present invention to obtain a dealuminated and stabilized Ω zeolite is as follows:

There is first prepared, according to techniques known in the prior art, a non-dealuminated Ω zeolite free or organic cations and of very low alkali content (sodium content lower than 0.5%, preferably 0.10% by weight). One of the methods for obaining said intermediary Ω zeolite is as follows:

Removal of organic cations by roasting under a mixture of inert gas, optionally with added oxygen (the oxygen molar content is higher than 2% and preferably higher than 10%) at a temperature from 450° to 650° C. and preferably from 500° to 600° C., for more than 20 mn.

Removal of the alkali cations by at least one cation exchange at a temperature ranging for example from 0° to 150° C. in a solution of ionizable ammonium salt (nitrate, sulfate, chloride, acetate etc . . . ) of molarity from 1 up to saturation, preferably from 3 to 10.

It is possible to reverse the order of "organic cations removal—alkali cations removal" or to omit the step of thermal decomposition of organic cations.

At the end of this series of treatments, the solid is not dealuminated and contains less than 0.5% and preferably less than 0.1% by weight of sodium.

The Ω zeolite obtained after this first series of treatments is subjected to roasting, preferably in the presence of steam. Two techniques may be used:

roasting in air or in inert atmosphere, preferably containing from 5 to 100% of steam with total flow rate ranging from 0.01 to 100 liters $h^{-1}g^{-1}$. The roasting temperature is from 500° to 900° C., the treatment time being longer than half an hour and preferably longer than 1 hour.

roasting between 500° and 900° C. in a confined atmosphere, i.e. without any external gas flow. The steam necessary for the treatment is then supplied by the product itself.

After roasting, in the optional presence of steam or in confined vapor, Ω zeolite is subjected to at least one acid etching at a temperature from 0° to 150° C. The relevant acids may be inorganic (hydrochloric, nitric, hydrobromic, sulfuric, perchloric acids) or organic (acetic or oxalic acid for example). The normality of the acid is from 0.1 to 10N (preferably from 0.5 to 2.0N) with a volume/weight ratio, expressed in $cm^3g^{-1}$, ranging from 2 to 10. The treatment time is longer than half an hour. It is preferable to perform the acid etching under controlled conditions to avoid the possible degradation of the solid. Accordingly, the zeolite may be first suspended in distilled water and the acid then progressively added.

In order to obtain a stabilized Ω zeolite of high $SiO_2/Al_2O_3$ molar ratio (higher than 10 or even than 50), according to the present invention, the preferred procedure is as follows:

(1) removal of organic cations by roasting in air,
(2) exchange of alkali cations ($Na^+$) with ammonium cations,
(3) roasting in the presence of steam,
(4) acid etching.

In order to obtain the desired $SiO_2/Al_2O_3$ ratio, it is necessary to conveniently select the operating conditions: for this purpose the most critical parameters are temperature, operating time and steam partial pressure selected in step (3) and the severity degree in step (4) (acid concentration, acid nature, temperature). When particularly high $SiO_2/Al_2O_3$ ratios, for example ratios higher than 100, are desired, it may be necessary to proceed in several cycles (roasting-acid etching), i.e. to perform several times the cyle "step 3–step 4).

The dealuminated omega zeolites obtained according to the invention exhibit very interesting properties when used as base for catalysts used in different reactions operating by acid action.

As a matter of fact, in a zeolite of protonic form, the acidity is due to the protons associated to aluminum atoms. Thus, partially dealuminated zeolites are hence also partially freed of protons. The dealumination techniques thus give the possibility to vary the number of acid sites. Moreover it is known that the intrinsic strength of an acid site depends on the site environment and hence of the $SiO_2/Al_2O_3$ ratio.

The dealuminated Ω zeolites according to the invention, have thus an acidity spectrum very different from the conventional non dealuminated Ω zeolites. This particular acid properties may be profitably used to produce catalysts for hydrocracking, hydroisomerization, reforming, dismutation, alkylation, polymerization etc . . . processes, by conveniently admixing the zeolite according to the invention with a suitable matrix, in the presence or absence of promoter metals or metal compounds.

The preferred pore distribution of the omega zeolite according to the invention is as follows:

0.2 to 50% of the total pore volume as pores whose radii range from 1.5 to 14 nm,
the remainder of pore volume being essentially contained within pores whose radii are lower than 1 nm.

The more prefered pore distribution is as follows:

1 to 50% of the total pore volume as pores whose radii range from 2 to 8 nm
the remainder of pore volume being essentially contained within pores whose radii are lower than 1 nm.

The hydrocracking of heavy petroleum cuts is a very important process in refining which provides, from heavy charges in excess, difficult to upgrade, lighter fractions such as gasolines, jet fuels and light gas oils required by the refiner to adapt its production to the demand structure. As compared with catalytic cracking, the interest of catalytic hydrocracking is to provide middle distillates, jet fuels and gas oils of very good quality. However, the produced gasoline has an octane number much lower than that obtained by catalytic cracking.

The catalysts used in hydrocracking are all bifunctional, associating an acid function with a hydrogenating function. The acid function is brought by carriers of large surfaces (about 150 to 800 $m^2.g^{-1}$) having a surface acidity, such as halogenated aluminas (mainly chlorinated or fluorinated), combinations of boron and aluminum oxides, amorphous silica-aluminas and zeolites. The hydrogenating function is brought by one or more metals from group VIII of the periodic classification of elements such as nickel, palladium or platinum for example, or by an association of at least two metals selected from group VI of the periodic classification (mainly molybdenum and tungsten), and from group VIII of the same classification (mainly cobalt and nickel), at least two metals of said association pertaining to two different groups (VI and VIII above mentioned).

The balance between the two acid and hydrogenating functions is a fundamental parameter which determines the activity and selectivity of the catalyst. A low acid function and a strong hydrogenating function give catalysts of low activity operating generally at high temperature (at least about 390° C.) and at a low feeding space velocity (the VVH, expressed in volume of treated charge per catalyst volume unit and per hour is generally lower than 2) but exhibiting a very good selectivity to middle distillates. Conversely, a strong acid function and a weak hydrogenating function give catalysts which are very active but exhibit a poor selectivity to middle distillates.

The conventional catalysts for catalytic hydrocracking are often prepared with carriers of low acidity such as amorphous silica-aluminas for example. These systems are used to produce middle distillates of very good quality or, when their acidity is very low, oil bases.

The category of carriers of low acidity includes the family of amorphous silica-aluminas. Many hydrocracking catalysts on the market consist of silica-alumina associated either with a metal of group VIII or, preferably when the content of heteroatomic poisons of the charge to be treated exceeds 0.5% by weight, with sulfides of metals from group VI B and VIII. These systems have a very good selectivity to middle distillates and the formed products are of good quality. The less acid catalysts of this type may also produce lubricating bases. The disadvantages of all these catalytic systems using an amorphous carrier is, as already mentioned, their low activity.

The acid zeolites offer the advantage, with respect to the other abovementioned acid carriers, to give a much higher acidity. The new catalysts containing them are hence more active and accordingly make it possible to operate at lower temperature and/or at higher feeding space velocity (VVH). However this higher acidity modifies the balance between the two catalytic, acid and hydrogenating functions. This results in a noticeable modification of selectivity of these catalysts as compared with conventional catalysts: they have a higher cracking activity and consequently produce more gasoline than middle distillates.

Thus the present invention also concerns a new type of zeolite catalyst, containing a zeolite whose physical characteristics and acidity have been described above and an amorphous matrix essentialy consisting of alumina or of a combination of oxides which will be defined hereinafter. This new type of catalyst has noticeably improved activity and selectivity to middle distillates as compared with the other systems or the prior art based on zeolites.

More particularly the invention concerns a catalyst containing by weight:

(a) about 20 to 98% (preferably 50 to 95%) of a matrix selected from the group consisting of at least alumina, silica, silica-alumina, alumina-boron oxide, magnesia, silica-magnesia, zirconia, titanium oxide, clay, (b) about 2 to 80% of the above-defined zeolite of Omega structure (or Mazzite).

Preferably the hydrocracking catalyst contains at least one metal or compound of metal selected from the group consisting of the noble or non noble metals from group VIII of the periodic classification of elements, the group VIII noble metal or metals concentration, expressed by weight of this or these metals, ranging from 0.03 to 3%, the group VIII non noble metal or metals concentration, expressed by weight of this or these metals, ranging from 0.05 to 10%.

The catalyst according to the invention is perfectly convenient for hydrocarbon hydrocracking. A hydrocracking catalyst containing a zeolite of the above-defined type, tested with a hydrotreated vacuum residue or another conventional heavy hydrocracking charge is much more active and selective to middle distillates than a catalyst containing a non modified Omega zeolite. Without prejudicing the reasons of said improvement with respect to a non modified Omega zeolite, it may be stated that the considered type of treatment has changed the nature and the strength of the acid function of the catalyst as well as the accessibility of the site to heavy hydrocarbon molecules, which typically comprise 20 to 40 carbon atoms.

The zeolite whose characteristics comply with the above-defined criteria is dispersed in a generally amorphous matrix consisting mainly of alumina, silica, silica-alumina, alumina-boron oxide, magnesia, silica-magnesia, zirconia, titanium oxide or a combination of at least two of the preceding oxides or a clay or a combination of the preceding oxides with clay. The purpose of this matrix essentially is to help in the shaping of the zeolite i.e. for the production of conglomerates, balls, extrudates, pellets etc . . . which will be used in an industrial reactor. The matrix proportion of the catalyst is from about 20 to 98% by weight and preferably from 50 to 95%.

The hydro-dehydrogenating component of the catalyst of the present invention is for example a compound of metal from group VIII of the periodic classification of elements (mainly nickel, palladium or platinum) or a combination of at least two of the preceding compounds, or a combination of compounds (mainly oxides) of group VI metals (mainly molybdenum and/or tungsten) and of non noble metals of group VIII (mainly cobalt and/or nickel) of the periodic classification of elements.

The final hydrocracking catalyst must comprise from 2 to 80% by weight of specially modified $\Omega$ zeolite and preferably from 3 to 50%. The metal compounds concentrations, expressed by weight of metal, are as follows: 0.01 to 5% by weight of metals from group VIII, preferably from 0.03 to 3% by weight only for noble metals of palladium and platinum type, 0.01 to 15% by weight of group VIII metals, preferably from 0.05 to 10% by weight for non noble metals of group VIII of the nickel type for example ple; when using simultaneously at least one metal or compound of metal from group VIII and at least one compound of metal from group VI, there is used about 5 to 40% by weight of a combination of at least one compound (mainly oxide) of a group VI metal (mainly molybdenum or tungsten) and of at least one metal or compound of metal from group VIII (mainly cobalt or nickel) and preferably 12 to 30% thereof, with a ratio by weight (expressed as metal oxides) of group VIII metals to group VI metals ranging from 0.5 to 0.8, preferably from 0.13 to 0.5.

The hydrogenating function such as precedingly defined (group VIII metals or association of groups VI and VIII metals oxides) may be introduin the catalyst at different steps of its preparation and in various manners.

It may be introduced only partly (for association of groups VI and VIII metal oxides) or in totality at the time of admixing zeolite with the oxide gel selected as the matrix. It may be introduced in one or several ion exchange operations on the roasted carrier consisting of the Ω zeolite dispersed in the selected matrix, by means of solutions containing precursor salts of the selected metals when the latter pertain to group VIII. It may be introduced in one or more impregnations of the shaped and roasted carrier, by a solution of precursors of the oxides of metals from group VIII (mainly Co and/or Ni) when the precursors of oxides of the metals from group VI (Mo and/or W) have been previously introduced at the step of carrier mixing. It may be finally introduced in one or more impregnation operations of the roasted carrier consisting of Ω zeolites and the matrix, by means of solutions, containing precursors of group VI and/or VIII metals oxides, the precursors of group VIII metals oxides being preferably introduced after those of group VI or simultaneously with the latter. The main precursor salts to be used are for example:

for group VIII (cobalt or nickel): nitrate, acetate, sulfate of hydrated divalent cations or haxammines cations $Co(NH_3)_6^{2+}$ and $Ni(NH_3)_6^{2+}$ for group VI (Mo and W): the various known ammonium molybdates or tungstates.

When the metal oxides are introduced in several impregnations with corresponding precusor salts, an intermediate roasting step of the catalyst must be performed at a temperature ranging from 250° to 600° C.

The impregnation of molybdenum or tungsten may be facilitated by addition of phosphoric acid in the solutions of ammonium paramolybdate. It is also possible to perform a molybdenum-nickel impregnation in the presence of phosphoric acid.

The so-obtained catalyst are perfectly convenient for the hydrocracking of heavy cuts and exhibit an improved activity as compared with the catalysts of the prior art, and have in addition an improved selectivity for producing middle distillates of high grade.

The charges used in this process are atmospheric or vacuum distillates, deasphalted or hydrotreated residues or equivalents. They consist of at least 80% by volume of compounds whose boiling points range from 350° to 580° C. They contain such heteroatoms as sulfur and nitrogen. The hydrocracking conditions such as temperature, pressure, hydrogen recycle rate, hourly volume velocity, may be adjusted to the nature of the charge, characterized mainly by the range of the boiling points, the content of aromatics polyaromatics content, the heteroatom content. The nitrogen content is generally from 5 to 2000 ppm and the sulfur content from 50 to 30.000 ppm.

The temperature is generally higher than 230° C. and often ranges from 300° to 430° C. The pressure is higher than 15 bars and generally higher than 30 bars. The hydrogen recycle rate is at least 100 and often ranges from 260 to 3000 liters of hydrogen per liter of charge. The hourly volume velocity generally ranges from 0.2 to 10.

The most important results for the refiner are, on the one hand, the activity and, on the other hand, the selectivity: naphtha or middle distillates. These objects must be achieved in conditions compatible with the economic reality. Thus the refiner's object is to decrease the temperature, the pressure, the hydrogen recycle rate and to maximize the hourly volume velocity. It is known that the conversion may be increased by increasing the temperature, but this is often to the prejudice of the selectivity. The selectivity to middle distillates improves with an increase of the pressure or of the hydrogen recycle rate, but this is to the prejudice of the process economy. This catalyst type provides, in conventional operating conditions, selectivities to distillates of boiling points ranging from 150° to 380° C., higher than 65%, and this for conversion rates to products of boiling point lower than 380° C. which are higher than 55% by volume. In addition, this catalyst exhibits in these conditions a remarkable stability, which is due mainly to the high specific surface of the product. Finally the catalyst composition and the quality of the zeolite makes the catalyst easily regenerable.

EXAMPLES

The following examples give more precise details of the characteristics of the invention but must not been considered as limiting the scope thereof.

EXAMPLE 1

Preparation of a stabilized Ω zeolite of hydrogen form having a $SiO_2/Al_2O_3$ molar ratio of 15.

100 g of Ω zeolite of molar composition 0.88 $Na_2O$, 0.12 $TMA_2O$, $Al_2O_3$, 8.30 $SiO_2$ have been roasted in a molar mixture 10% $O_2$ + 90% $N_2$ (total flow rate: 5 l $h^{-1}$) at 550° C. for two hours. At the end of said step, the TMA cations were removed. The obtained solid is referenced OM1.

The OM1 solid is then subjected to three cation exchanges in a $NH_4NO_3$ 6N solution at 100° C. for two hours under stirring. The volume ratio of the solution to the weight of dry solid is equal to 4. The sodium content obtained after three exchanges is equal to 0.04% by weight. The solid is referenced OM2.

The characteristics of OM2 solid are as follows:

| X-ray diffraction | | | | |
|---|---|---|---|---|
| | Parameters | | Cristallinity | Adsorption |
| | a (nm) | c | % | $N_2$ (% by weight) |
| OM2 | 1.815 | 0.760 | 100 | 11 |

TABLE 1 below gives the X-ray diffraction diagram of OM2.

TABLE 1

Characteristics of X-ray diffraction diagram of OM2 Omega zeolite of crystalline parameters a = 1.815 nm and c = 0.760 nm

| 2θ | d(nm) | I/I max. |
|---|---|---|
| 5.55 | 1.591 | 10 |
| 9.74 | 0.908 | 100 |
| 11.27 | 0.785 | 15 |
| 12.94 | 0.684 | 55 |
| 14.93 | 0.593 | 55 |
| 16.24 | 0.546 | 20 |
| 16.95 | 0.523 | 10 |
| 18.99 | 0.467 | 25 |
| 20.43 | 0.435 | 10 |
| 22.69 | 0.392 | 20 |
| 23.54 | 0.378 | 90 |
| 24.08 | 0.369 | 40 |
| 24.71 | 0.360 | 40 |
| 25.42 | 0.350 | 75 |
| 26.03 | 0.342 | 25 |
| 28.43 | 0.313 | 70 |
| 29.04 | 0.307 | 40 |

TABLE 1-continued

| Characteristics of X-ray diffraction diagram of OM2 Omega zeolite of crystalline parameters a = 1.815 nm and c = 0.760 nm | | |
|---|---|---|
| 2θ | d(nm) | I/I max. |
| 29.57 | 0.302 | 30 |
| 30.77 | 0.290 | 75 |
| 33.94 | 0.264 | 15 |
| 34.22 | 0.262 | 10 |

The OM2 solid is subjected to two successive treatments, a self steaming or roasting under steam, then an acid etching. The references of the solids are identicated in the following scheme:

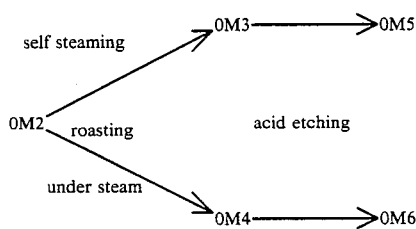

The operating conditions used for these different treatments are indicated in details hereinafter:

Self steaming (or hydrothermal treatment)

The solid is charged in a reactor and then placed in a furnace previously heated to 600° C. The treatment is performed in static atmosphere for two hours.

Roasting under steam
temperature rising rate: 10° C. $mn^{-1}$,
air flow rate: 3 l $h^{-1}g^{-1}$,
water introduction at 400° C. and liquid water flow rate of 2.25 $cm^3$ $h^{-1}g^{-1}$, i.e. a steam molar content of 50%,
final temperature 600° C. and two-hours stage at said temperature,
decrease to room temperature in air, flow rate 6 l $h^{-1}g^{-1}$.

Acid etching
HCl 1N,
V/P ratio = 13 $cm^3$/g dry solid
T = 100° C.
operating time: 4 hours under stirring.

TABLE 2

| Physicochemical characteristics of OM3, OM4, OM5 and OM6 solids | | | | |
|---|---|---|---|---|
| | OM3 | OM4 | OM5 | OM6 |
| SiO$_2$/Al$_2$O$_3$ moles | 8.3 | 8.3 | 15 | 16 |
| X-ray diffraction | | | | |
| Cristallinity % | 83 | 86 | 80 | 79 |
| Parameter (nm) | | | | |
| a | 1.814 | 1.814 | 1.812 | 1.812 |
| c | 0.757 | 0.756 | 0.756 | 0.755 |
| Adsorption | | | | |
| N$_2$ % by weight | 8.1 | 8.5 | 12.6 | 12.2 |

The characteristics of OM3, OM4, OM5 and OM6 solids are reported in table 2. The dealuminated and stabilized OM5 and OM6 OMEGA zeolites have a lattice of secondary pores generated by the treatments to which said solids have been subjected. The radii of these secondary pores are centered about a radius of 4.0 nm. The OMEGA zeolites in H form referenced OM5 and OM6 have a SiO$_2$/Al$_2$O$_3$ ratio which is practically twice that of the starting zeolite and keep a good crystallinity.

The dealuminated Ω zeolites OM5 and OM6 have a clearly improved thermal stability as compared with the starting product. As a matter of fact, after roasting achieved at 950° C. for 5 hours in a dry air flow of 15 l $h^{-1}g^{-1}$, OM5 and OM6 zeolites keep crystallinity rates respectively equal to 70 and 73%. The roasting in the same conditions of the starting zeolite or of OM1 and OM2 solids results in a destruction of the crystalline structure equivalent to a zero crystallinity rate.

EXAMPLE 2

Preparation of a stabilized Ω zeolite in hydrogen form having a SiO$_2$Al$_2$O$_3$ molar ratio of 25.

It is possible to vary within a wide range the SiO$_2$/Al$_2$O$_3$ molar ratio of the Ω zeolite by modifying the temperature and/or the steam content of the thermal treatments.

This example has for purpose to illustrate the effect of the temperature of the thermal treatment performed in the presence of steam. The operating conditions are strictly identitical to those used in example 1 to prepare OM5 solid. The only difference concerns the temperature of self steaming performed on OM2 solid; this treatment is here achieved at 700° C. The solid obtained after self steaming at 700° C. from OM2 is referenced OM7, then OM8 after acid etching. The physicochemical characteristics of OM7 and OM8 solids are sumarized in the following table:

| | OM7 | OM8 |
|---|---|---|
| SiO$_2$/Al$_2$O$_3$ (moles) | 8.3 | 25 |
| X-ray diffraction | | |
| Crystallinity % | 79 | 80 |
| Parameter (nm) | | |
| a | 1.807 | 1.805 |
| c | 0.755 | 0.755 |
| Adsorption | | |
| N$_2$ (% by weight) | 6 | 13 |

The Ω zeolite of H form referenced OM8 has a SiO$_2$/Al$_2$O$_3$ ratio which is about three times that of the starting zeolite and keeps a good crystallinity. Its pore structure is characterized by a secondary mesoporosity which is centered about a radius of 4 nm. The secondary pores distribution by radii ranges from 1.5 to 8 nm. The OM8 dealuminated Ω zeolite has a clearly improved thermal stability as compared with the starting product. As a matter of fact, after roasting at 950° C. for 5 hours under a dry flow of 15 l $h^{-1}g^{-1}$, the OM8 zeolite keeps a crystallinity rate of 70%. The roasting in the same conditions of the starting zeolite or of OM1 and OM2 solids leads to a destruction of the crystalline structure, thus to a zero crystallinity rate.

EXAMPLE 3

Preparation of stabilized Ω zeolite in hydrogen form having a SiO$_2$/Al$_2$O$_3$ molar ratio of 50.

In order to obtain by the technique described in the two preceding examples (thermal treatment in the presence of steam followed with acid etching) a stabilized Ω zeolite of very high SiO$_2$/Al$_2$O$_3$ ratio, two ways are possible consisting respectively in increasing the treatments severity or in repeating the treatments, i.e. proceeding to cycles of: roasting in the presence of steam-acid etching. This example illustrates the second way.

The OM5 solid described in example 1 is successively subjected to:
a self steaming in the conditions of example 2, i.e. at 700° C.,
an acid etching in the conditions of example 1. The solid obtained after self steaming at 700° C. is referenced OM9, that obtained from OM9 by acid etching is referenced OM10. The physicochemicals characteristics of OM9 and OM10 are reported in the following table:

|  | OM9 | OM10 |
|---|---|---|
| $SiO_2/Al_2O_3$ moles | 15 | 50 |
| X-ray diffraction |  |  |
| Cristallinity % | 75 | 85 |
| Parameter (nm) |  |  |
| a | 1.802 | 1.801 |
| c | 0.754 | 0.753 |
| Adsorption |  |  |
| $N_2$ (% by weight) | 12 | 14 |

The OM9 and OM10 zeolites, as the dealuminated and stabilized OM5, OM6, OM8 solids have a lattice of secondary pores of radii centered about 4 nm. The thermal stability of OM10 is quite similar to that of OM8 (example 2). The cristallinity is still maintained at 82% after roasting at 950° C. in a dry air stream of 15 l $h^{-1}g^{-1}$ for 5 hours.

EXAMPLE 4

Preparation of a stabilized Ω zeolite in hydrogen form, having a $SiO_2/Al_2O_3$ molar ratio of 150.

As in example 3, successive cycles of roasting in the presence of steam-acid etching are performed.

The starting solid is OM8 zeolite of example 2. This solid is successively subjected to:
a self steaming in the conditions of example 1 but at a higher temperature of 800° C.,
an acid etching in the conditions of example 1.

The solid obtained after self steaming is referenced OM11 and then OM12 after acid etching. The physicochemical characteristics of said solids are given in the following table:

|  | OM11 | OM12 |
|---|---|---|
| $SiO_2/Al_2O_3$ moles | 25 | 150 |
| X-ray diffraction |  |  |
| Crystallinity % | 75 | 90 |
| Parameter (nm) |  |  |
| a | 1.798 | 1.796 |
| c | 0.752 | 0.752 |
| Adsorption |  |  |
| $N_2$ (% by weight) | 12 | 15 |

The distribution by radii of the secondary mesoporosity of OM11 and OM12 is quite similar to that of OM10 (example 3). The thermal stability of OM11 and OM12 remains excellent since the crystallinity rate of said solids are still respectively equal to 73 and 85% after thermal treatment for 5 hours at 950° C. in a dry air flow rate of 15 l $h^{-1}g^{-1}$.

EXAMPLE 6 (comparative)

Preparation of Ω zeolite having a $SiO_2/Al_2O_3$ ratio of 50, by direct acid etching.

100 g of OM1 zeolite (example 1) are subjected to two successive acid etchings in 400 cc of a 1N HCl solution at 100° C. for 4 hours. The solid obtained by this treatment is referenced OM14. It has a zero crystallinity rate and a $SiO_2/Al_2O_3$ molar ratio of 50. It is hence possible to dealuminate Ω zeolite by direct acid etching, i.e. to first proceed with a thermal treatment in the presence of steam. However, this direct acid treatment leads to a very important degradation of the crystalline structure.

EXAMPLE 7 (comparative)

Preparation of an Ω zeolite in hydrogen form having a $SiO_2/Al_2O_3$ molar ratio of 7.6.

100 g of Ω zeolite of molar composition 0.90 $Na_2O$–0.10 $TMA_2O$–$Al_2O_3$–7.6 $SiO_2$ are roasted at 500° C. for 2 hours in a mixture of nitrogen and oxygen. The flow rates are respectively 65 l $h^{-1}$ for nitrogen and 20 l $h^{-1}$ for oxygen. After this treatment the TMA cations are removed.

The zeolite is then exchanged three times in 600 cc of a 5N $NH_4NO_3$ solution at 100° C. for 3 hours. The obtained solid, referenced OM13, has a X-ray diffraction spectrum of Ω zeolite and exhibits the following physicochemical characteristics:

|  | % Na | X-ray diffraction | | | Adsorption |
|---|---|---|---|---|---|
|  |  | Crystallinity | Parameters | | Nitrogen |
| $SiO_2/Al_2O_3$ | b.w. | % | a (nm) | c | % b.w. |
| 7.6 | 0.04 | 100 | 1.818 | 0.761 | 12 |

In contrast with the dealuminated solids described in examples 1 to 5, OM13 has no secondary microporosity and is destroyed by roasting in dry air at 950° C.

EXAMPLE 8

Preparation of catalysts A, B and C.

The OM8 Ω zeolites of example 2, OM12 of example 4 and OM13 of example 7 are used to prepare catalysts respectively referenced A, B, C.

The composition by weight of catalysts A, B, C is as follows:
16% Omega zeolite
3% nickel oxide NiO
14% molybdenum oxide $MoO_3$
4% phosphorus oxide $P_2O_5$
63% alumina $Al_2O_3$ The alumina is a pseudo-boehmite obtained by hydrolysis of an aluminum alcoholate; the gel is peptized by addition of nitric acid, then mixed. The Ω zeolite is then added after mixing, the paste is forced through a drawing-plate of 1.4 mm diameter, then dried in an air stream at 120° C. and roasted at 550° C. for 1 hour.

The so-obtained carrier is impregnated after cooling by the dry impregnation technique in a rotary bowl granulator. The impregnating solution consists of nickel nitrate, ammonium para-molbydate and phosphoric acid. The impregnated extrudates are then dried and roasted in air at 500° C. for 2 hours.

EXAMPLE 9

Catalysts A, B, C, whose preparations are described in the preceding example, are used in hydrocracking tests.

60 ml of catalyst are charged in the test unit, then presulfurized by passing a charge consisting of 98% by weight of n-hexane and 2% by weight of dimethyldisulfide, at a temperature of 320° C. and under a hydrogen pressure of 60 bars.

The charge to be treated has the following characteristics:

10% point: 382° C.
50% point: 429° C.
90% point: 475° C.
Density $d_4^{20}$: 0.856
N (ppm): 630
% S: 2.07

After presulfurization, the pressure is increased to 120 bars, the charge is fed over the catalyst at a hourly volume velocity of 1 liter of charge per liter of catalyst and per hour, the hydrogen flow rate being 1000 liters of hydrogen gas per liter of liquid charge.

The catalysts are progressively brought to the temperature of 370° C.

The performances are defined according to two criteria: conversion and selectivity. The conversion is defined as being the fraction of the recovered product of boiling point lower than 380° C. The selectivity is defined as a fraction of recovered products of boiling points ranging from 150° to 380° C., in proportion to the conversion.

The results, after 100 hours of stabilization are as follows:

| Catalyst | $SiO_2/Al_2O_3$ molar ratio of Ω zeolite | Conversion | Selectivity |
| --- | --- | --- | --- |
| A | 25 | 82 | 63 |
| B | 150 | 43 | 80 |
| C | 7.6 | 70 | 52 |

Catalyst A, containing Ω zeolite of molar ratio 25 is, on the one hand, more active and, on the other hand more selective than catalyst C containing a non-dealuminated Ω zeolite of 7.6 molar ratio. Catalyst B is relatively less active as a result of a very extensive dealumination of the zeolite of which it is formed; however this low activity is compensated by a high selectivity.

What is claimed as the invention is:

1. A dealuminated zeolite of omega (or mazzite) structure characterized by:
   a total $SiO_2\ Al_2O_3$ molar ratio of at least 10,
   a sodium content lower than 0.5% by weight, determined on the zeolite roasted at 1100° C.,
   a and c parameters of elementary mesh respectively lower than 1.84 nm and 0.759 nm,
   a nitrogen adsorption capacity at 77 K, under a partial pressure P/Po=0.19, higher than 5% by weight,
   a pore distribution such that from 0.2 to 50% of the pore volume is provided by pores of radii ranging from 1.5 to 14 nm, the remaining pore volume being provided by pores of a radius less than 1 nm.

2. A zeolite according to claim 1, characterized by:
   a total $SiO_2/Al_2O_3$ molar ratio higher than 15,
   $\overline{a}$ and $\overline{c}$ crystalline parameters respectively ranging from 1.814 to 1.794 nm and from 0.759 to 0.749 nm,
   a nitrogen adsorption capacity at 77 K, for a partial pressure P/Po=0.19, higher than 11% by weight,
   a pore distribution such that 1 to 50% of the pore volume is pores of radii ranging from 2 to 8 nm, the remaining pore volume being in pores of radii lower than 1 nm.

3. A process for manufacturing an omega zeolite as defined in claim 1, from a synthetic omega zeolite, containing alkali cations and organic cations, and whose $SiO_2/Al_2O_3$ molar ratio is from 6 to 10, said manufacturing process being characterized in that (a) in a first step the synthetic zeolite is subjected to a treatment for removal of the major part of the organic cations, while decreasing the alkali content to a value lower than 0.5% by weight, by means of at least one treatment selected from the group consisting of a cation exchange and a roasting, and (b) in a second step the solid obtained in the preceding step is subjected to at least one roasting followed with at least one acid etching, so as to obtain a $SiO_2/Al_2O_3$ molar ratio higher than 10.

4. A process according to claim 3, wherein, during the second step, the synthetic zeolite is subjected to at least one roasting in air or in inert atmosphere between 500° and 900° C., the acid etching temperature being from 0° to 150° C.

5. A process according to claim 4, performed in the presence of steam.

6. A process according to claim 3, wherein, during the second step, the synthetic zeolite is subjected to at least one calcination in confined atmosphere, the temperature of acid etching being from 0° to 150° C.

7. A catalyst containing by weight:
   (a) about 50 to 95% of a matrix selected from the group consisting of at least alumina, silica, silica-alumina, alumina-boron oxide, magnesia, silica-magnesia, zirconia, titanium oxide, clay,
   (b) about 3 to 50% of a zeolite according to claim 1,
   (c) at least one metal or compound of metal selected from the group consisting of the noble or non noble metals of group VIII of the periodic classification of elements, the concentration of noble metal or metals from group VIII, expressed by weight of this or these metals, ranging from 0.03 to 3%, the concentration of non noble metal or metals from group VIII, expressed by weight of this or these metals, ranging from 0.05 to 10%.

8. A zeolite produced according to claim 3.
9. A zeolite produced according to claim 4.
10. A zeolite produced according to claim 5.
11. A zeolite produced according to claim 6.
12. A catalyst containing by weight:
   (a) about 50 to 95% of a matrix selected from the group consisting of at least alumina, silica, silica-alumina, alumina-boron oxide, magnesia, silica-magnesia, zirconia, titanium oxide, clay,
   (b) about 3 to 50% of a zeolite according to claim 8,
   (c) at least one metal or compound of metal selected from the group consisting of the noble or non noble metals of group VIII of the periodic classification of elements, the concentration of noble metal or metals from group VIII, expressed by weight of this or these metals, ranging from 0.03 to 3%, the concentration of non noble metal or metals from group VIII, expressed by weight of this or these metals, ranging from 0.05 to 10%.

13. A catalyst containing by weight:
   (a) about 50 to 95% of a matrix selected from the group consisting of at least alumina, silica, silica-alumina, alumina-boron oxide, magnesia, silica-magnesia, zirconia, titanium oxide, clay,
(b) about 3 to 50% of a zeolite according to claim 9,
(c) at least one metal or compound of metal selected from the group consisting of the noble or non noble metals of group VIII of the periodic classification of elements, the concentration of noble metal or metals from group VIII, expressed by weight of this or these metals, ranging from 0.03 to 3%, the concentration of non noble metal or metals from group VIII, expressed by weight of this or these metals, ranging from 0.05 to 10%.

14. A catalyst containing by weight:
(a) about 50 to 95% of a matrix selected from the group consisting of at least alumina, silica, silica-alumina, alumina-boron oxide, magnesia, silica-magnesia, zirconia, titanium oxide, clay,
(b) about 3 to 50% of a zeolite according to claim 13,
(c) at least one metal or compound of metal selected from the group consisting of the noble or non noble metals of group VIII of the periodic classification of elements, the concentration of noble metal or metals from group VIII, expressed by weight of this or these metals, ranging from 0.03 to 3%, the concentration of non noble metal or metals from group VIII, expressed by weight of this or these metals, ranging from 0.05 to 10%.

15. A catalyst containing by weight:
(a) about 50 to 95% of a matrix selected from the group consisting of at least alumina, silica, silica-alumina, alumina-boron oxide, magnesia, silica-magnesia, zirconia, titanium oxide, clay,
(b) about 3 to 50% of a zeolite according to claim 11,
(c) at least one metal or compound of metal selected from the group consisting of the noble or non noble metals of group VIII of the periodic classification of elements, the concentration of noble metal or metals from group VIII, expressed by weight of this or these metals, ranging from 0.03 to 3%, the concentration of non noble metal or metals from group VIII, expressed by weight of this or these metals, ranging from 0.05 to 10%.

* * * * *